US012780065B2

(12) United States Patent
Takeuchi et al.

(10) Patent No.: US 12,780,065 B2
(45) Date of Patent: Nov. 3, 2026

(54) CUSHION BODY FOR VEHICLE SEAT

(71) Applicant: TOYOTA BOSHOKU KABUSHIKI KAISHA, Aichi-ken (JP)

(72) Inventors: Shogo Takeuchi, Toyota (JP); Teruyuki Hadatsuki, Miyoshi (JP); Yorihisa Inagaki, Obu (JP); Mayu Takahashi, Toyohashi (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 71 days.

(21) Appl. No.: 18/918,733

(22) Filed: Oct. 17, 2024

(65) Prior Publication Data

US 2025/0145068 A1 May 8, 2025

(30) Foreign Application Priority Data

Nov. 7, 2023 (JP) ................................ 2023-189879

(51) Int. Cl.

*B60N 2/70* (2006.01)
*B60R 16/04* (2006.01)
*H01M 50/204* (2021.01)
*H01M 50/249* (2021.01)
*H01M 50/262* (2021.01)

(52) U.S. Cl.

CPC ............ *B60N 2/7017* (2013.01); *B60R 16/04* (2013.01); *H01M 50/204* (2021.01); *H01M 50/249* (2021.01); *H01M 50/262* (2021.01); *H01M 2220/20* (2013.01)

(58) Field of Classification Search

CPC ..... B60N 2/7017; B60N 2/70; H01M 50/209; H01M 50/249; H01M 2220/20; B60R 16/04

See application file for complete search history.

(56) References Cited

U.S. PATENT DOCUMENTS

2021/0194086 A1 6/2021 Ohkuma et al.
2025/0145068 A1* 5/2025 Takeuchi ............ H01M 50/262

FOREIGN PATENT DOCUMENTS

DE 112019004274 5/2021
FR 2724606 3/1996
JP 2007-186200 7/2007
JP 2016088362 A * 5/2016
JP 2018127016 A * 8/2018
JP 2020083223 A * 6/2020

(Continued)

OTHER PUBLICATIONS

Trans. JP-2016088362-A (Year: 2026).*

(Continued)

*Primary Examiner* — J. T. Newton

(74) *Attorney, Agent, or Firm* — Greenblum & Bernstein, P.L.C.

(57) ABSTRACT

A cushion body for vehicle seat which is placed on variety of battery cases attached on a floor, wherein the cushion body has an upper surface and a lower surface and when a shape of an upper surface of the battery cases attached on the floor are superimposed on each other, the lower surface of the cushion body has a shape that does not interfere with the upper surface of any of the battery cases and contacts with a part of the upper surface of any of the battery cases.

6 Claims, 6 Drawing Sheets

(56) References Cited

FOREIGN PATENT DOCUMENTS

| | | | | | |
|---|---|---|---|---|---|
| JP | 7415688 | B2 * | 1/2024 | .............. | B60L 50/64 |
| WO | WO-2023210523 | A1 * | 11/2023 | ............... | B60N 2/06 |

OTHER PUBLICATIONS

Trans. JP-2018127016-A (Year: 2026).*
Trans. JP-2020083223-A (Year: 2026).*
Trans. JP-7415688-B2 (Year: 2026).*
Trans WO-2023210523-A1 (Year: 2026).*
Office Action issued in German Patent Application No. 102024129998.3, dated Jun. 17, 2026, together with English translation thereof.

* cited by examiner

CUSHION BODY FOR VEHICLE SEAT

CROSS-REFERENCE TO RELATED APPLICATION

This application claims priority to Japanese patent application serial number 2023-189879, filed Nov. 7, 2023, the content of which is incorporated herein by reference in its entirety for all purposes.

TECHNICAL FIELD

The present disclosure relates to a cushion body for vehicle seat. In particular, the present disclosure relates to a cushion body for vehicle seat which is placed on a battery case disposed on a floor.

BACKGROUND

Some automobile seats have a cushion body of a seat cushion which is placed on a battery case disposed and attached on a floor. For example, according to a vehicle seat described in a prior art, a cushion body of a seat cushion for a rear seat, which is a bench seat, is placed on a battery case attached on a floor.

In the rear seat described in the above prior art, if there are several types of battery cases with different upper surface shapes, it was necessary to prepare several types of cushion bodies for the seat cushion in order to fit the lower surface shapes of the cushion bodies of the seat cushion. This caused an increase in the number of components.

Accordingly, the subject matter of the present disclosure is to provide a cushion body for vehicle seat which can be placed on a variety of battery cases with different upper surface shapes.

SUMMARY OF THE DISCLOSURES

According to one aspect of the present disclosure, a cushion body for vehicle seat which is placed on the variety of battery cases disposed on a floor, wherein when a shape of an upper surface of the battery cases attached on the floor are superimposed on each other, a lower surface of the cushion body has a shape that does not interfere with the upper surface of any of the battery cases and contacts with a part of the upper surface of any of the battery cases.

DETAILED DESCRIPTION

FIGS. 1 to 6 show an embodiment of the present disclosure. This embodiment is an example of applying the art of the present disclosure to a cushion pad 10 of a seat cushion 2 in a rear seat 1 for an automobile. Each direction such as front, rear, right, left, up, down, etc. indicates each direction when the rear seat 1 is mounted on a floor F of the automobile. In the following description, the descriptions regarding the directions shall be based on these directions. Here, the rear seat 1 corresponds to the "vehicle seat" of the present disclosure.

Figure 1:
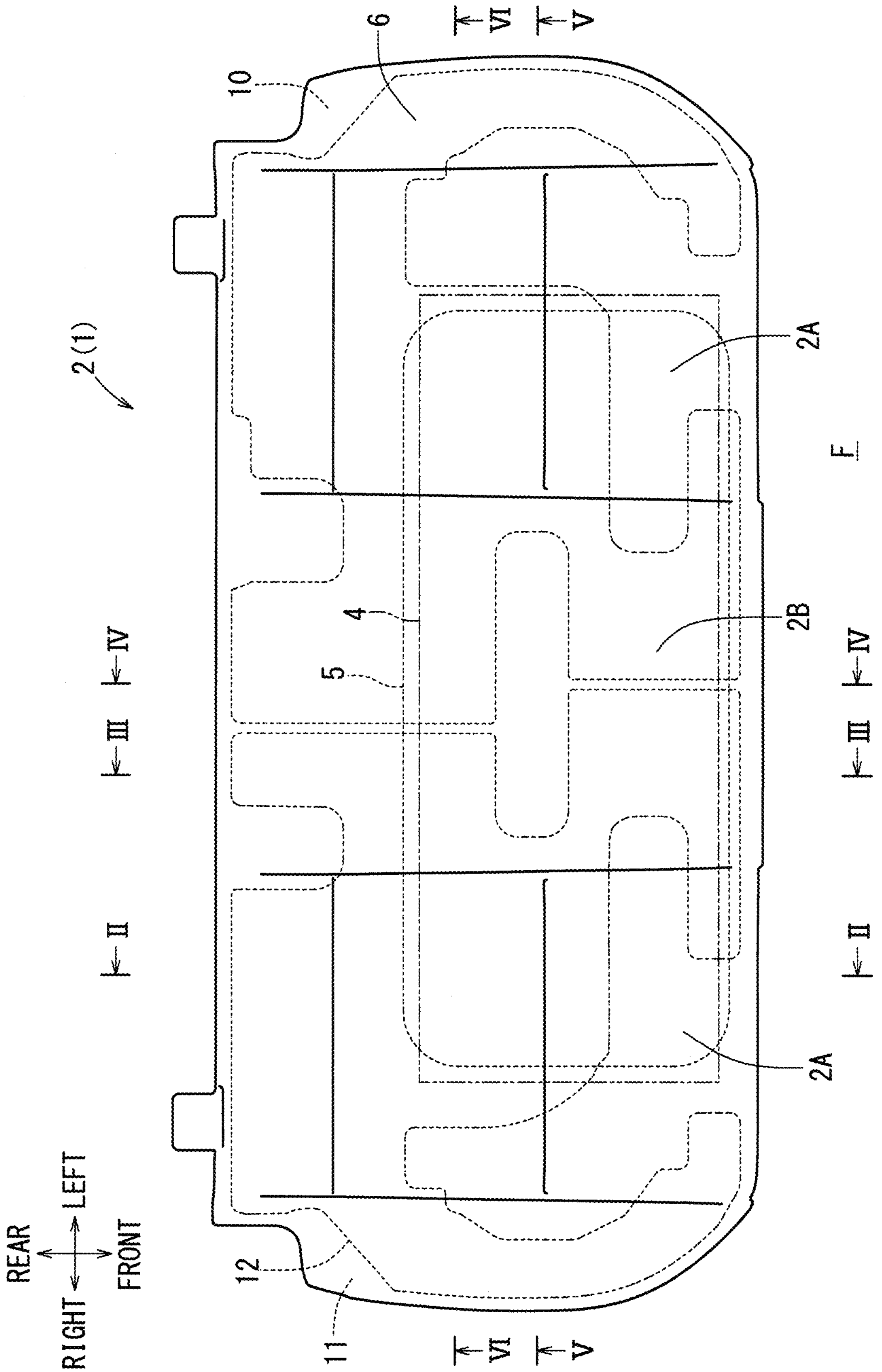
FIG. 1 is a plan view of a seat cushion of a rear seat for an automobile according to an embodiment of the present disclosure.
Figure 2:
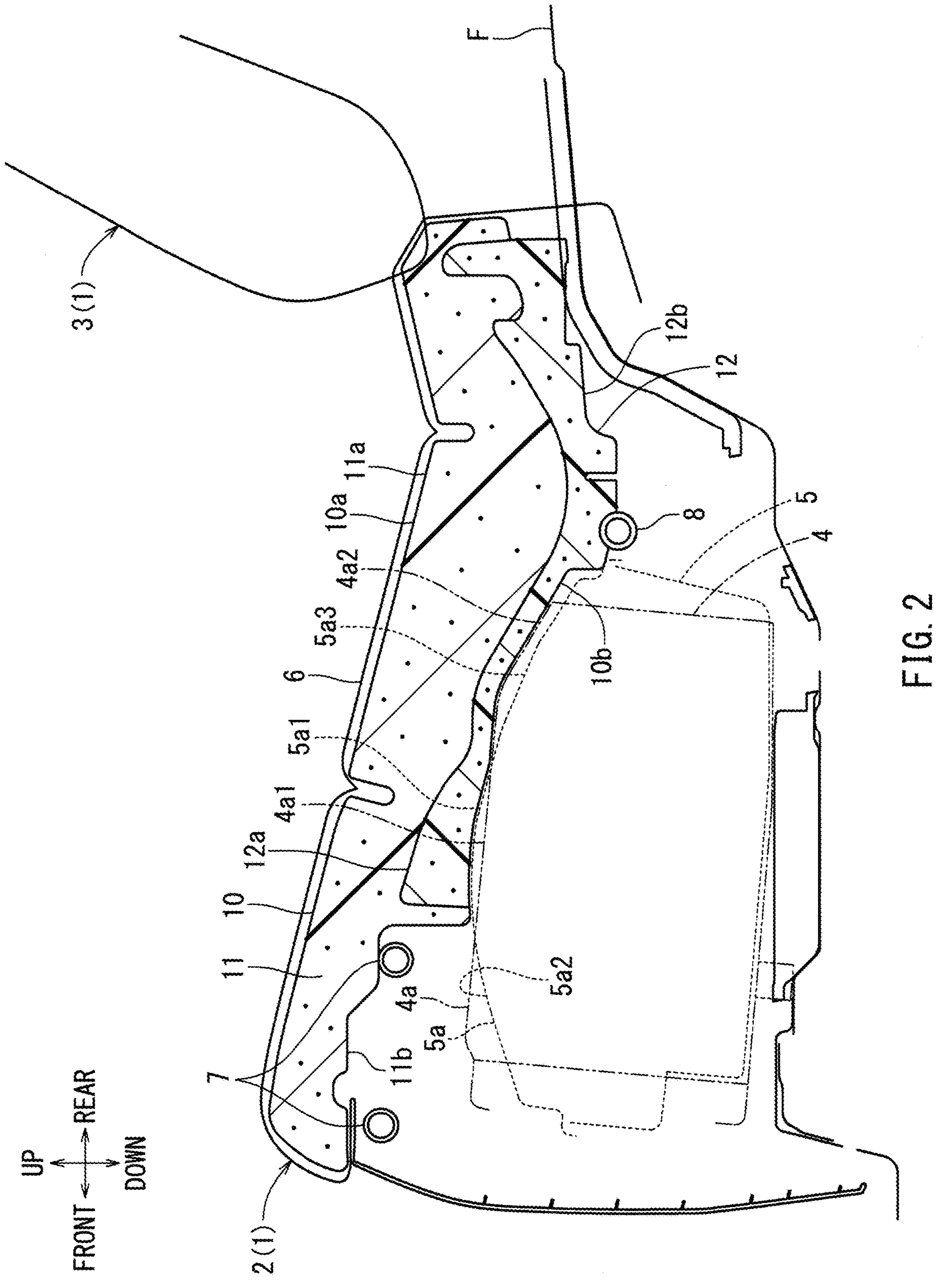
FIG. 2 is a cross-sectional view taken along a line II-II in FIG. 1.
Figure 3:
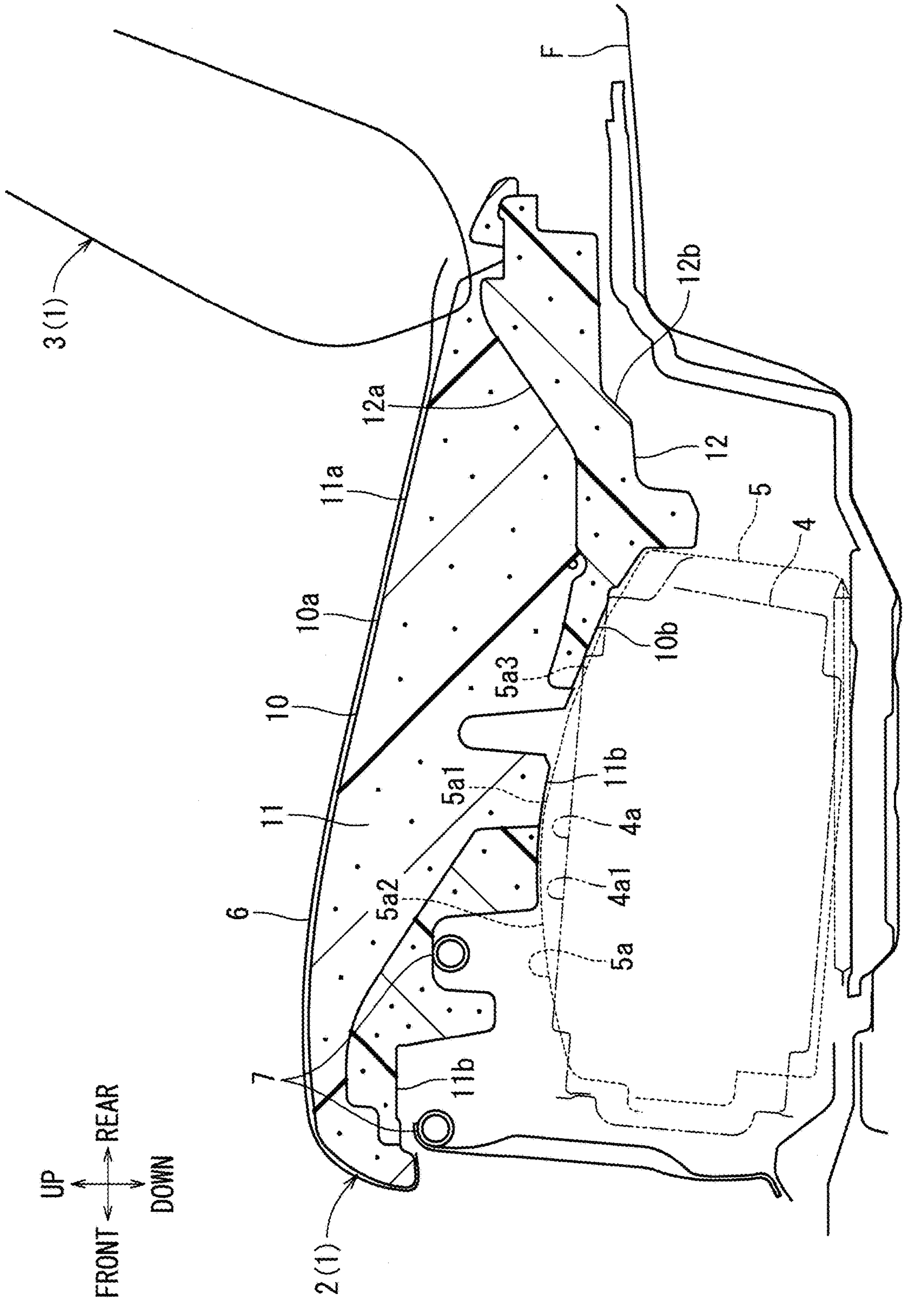
FIG. 3 is a cross-sectional view taken along a line III-III in FIG. 1.
Figure 4:
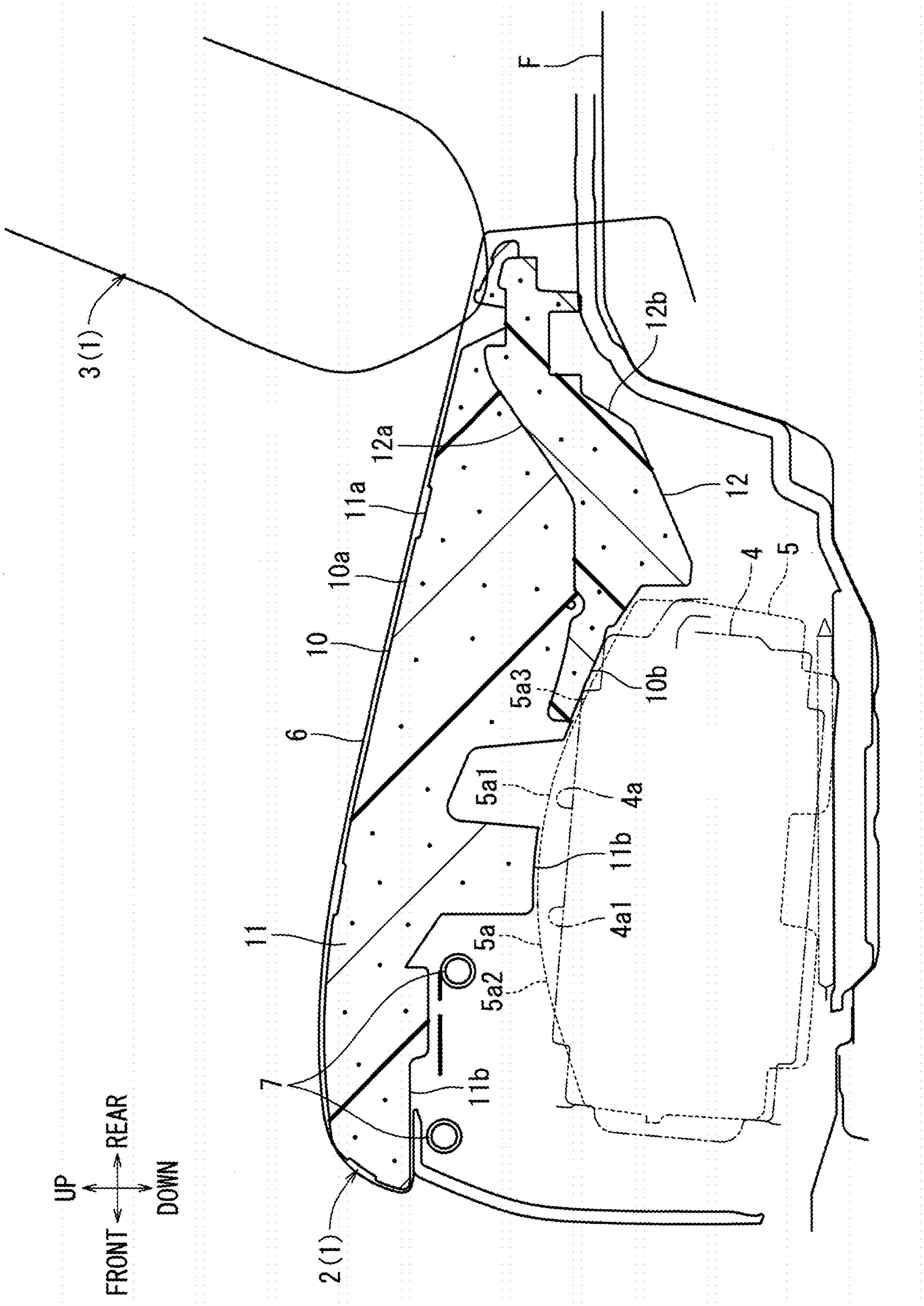
FIG. 4 is a cross-sectional view taken along a line IV-IV in FIG. 1.
Figure 5:
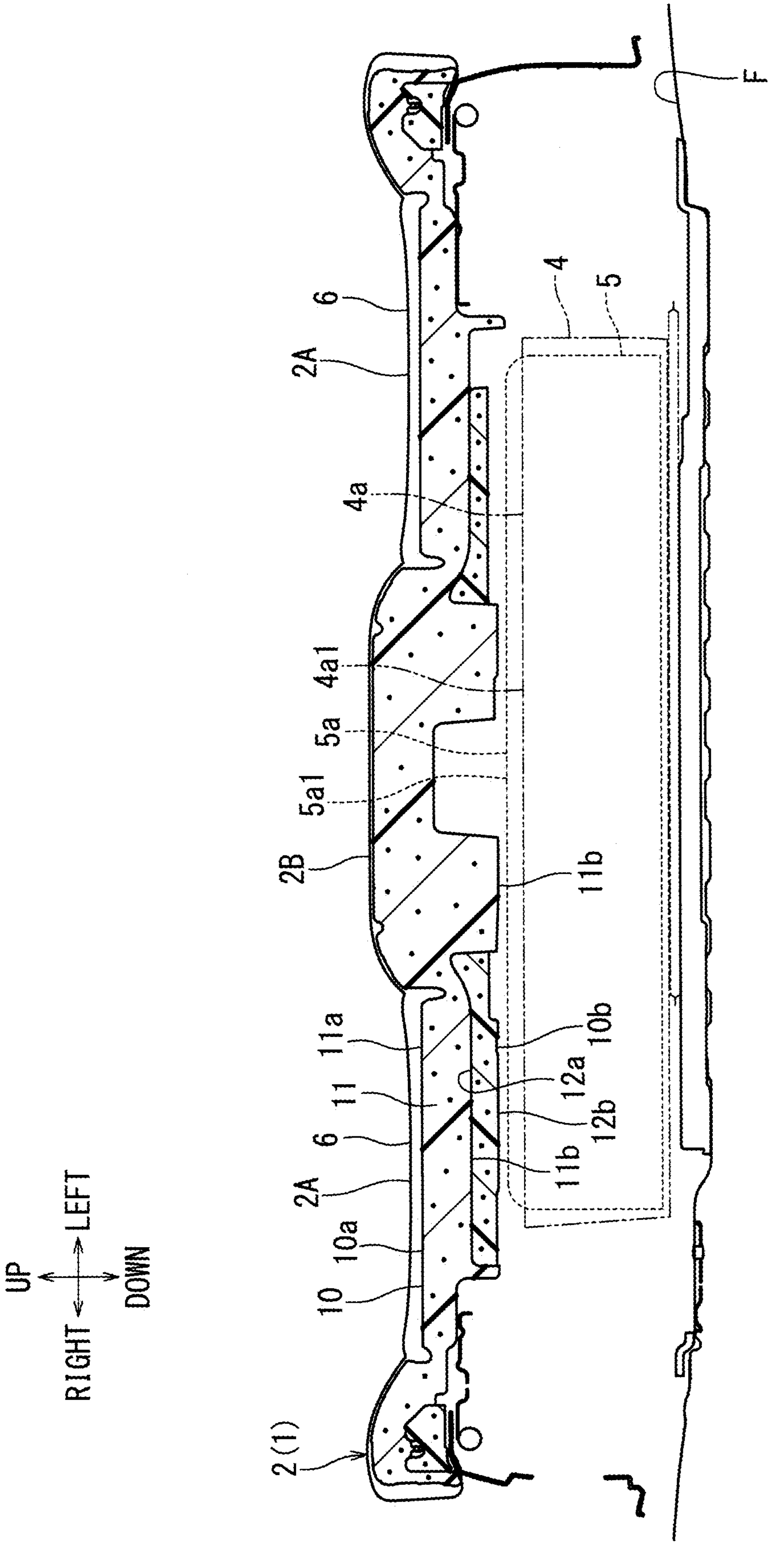
FIG. 5 is a cross-sectional view taken along a line V-V in FIG. 1.
Figure 6:
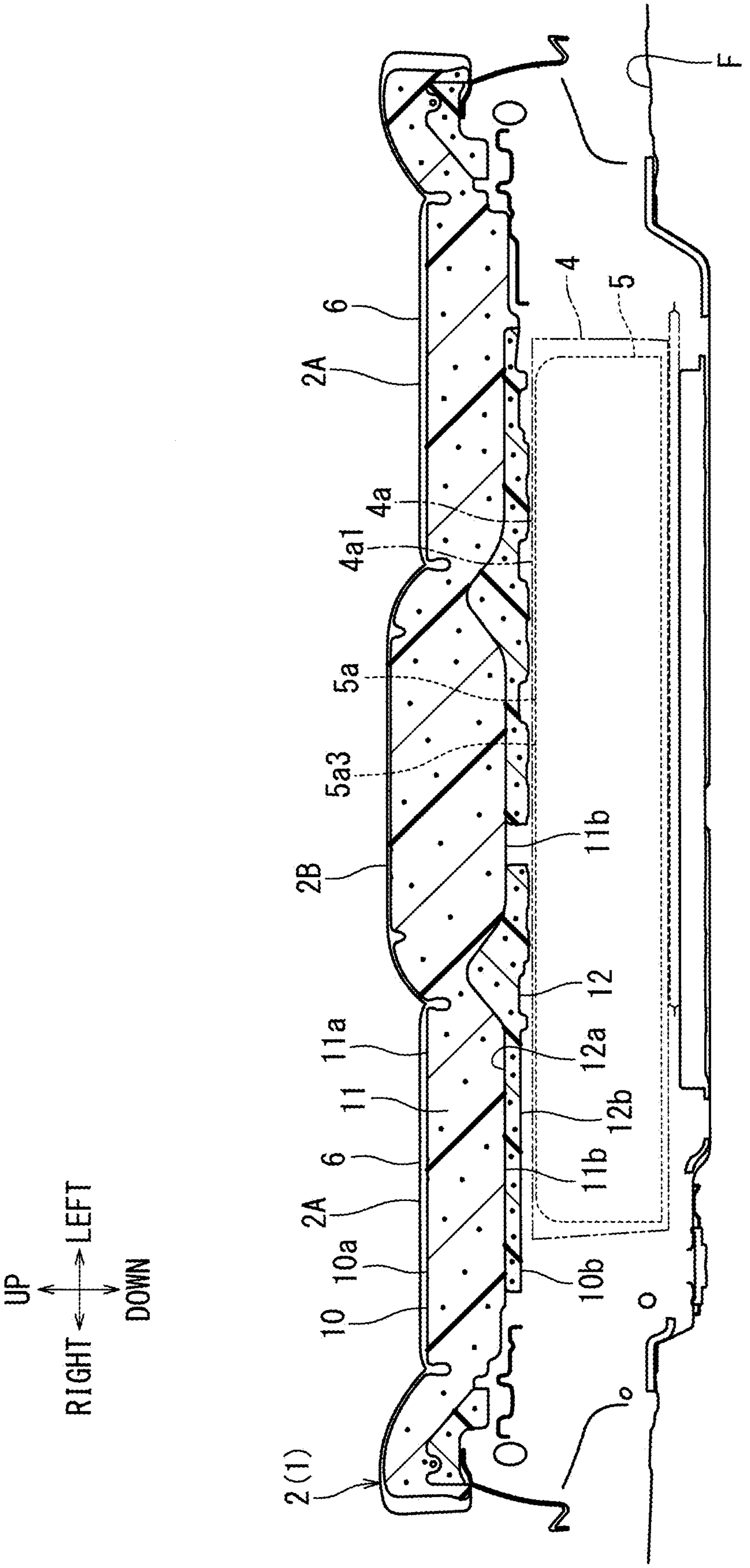
FIG. 6 is a cross-sectional view taken along a line VI-VI in FIG. 1.

The rear seat 1 of the embodiment is a bench seat for three passengers. The cushion pad 10 is used for the seat cushion 2, which is the seating portion of the rear seat 1. The cushion pad 10 has a length in the right-left direction that is approximately the same as the width of the car compartment. As shown in FIGS. 2 to 4, a seat back 3, which is a backrest, is attached to the rear end of the seat cushion 2. The rear seat 1 comprises the seat cushion 2 and seat back 3. Here, the cushion pad 10 corresponds to the "cushion body" of the present disclosure.

As shown in FIGS. 2 to 6, the seat cushion 2 is placed and attached on a first battery case 4 or a second battery case 5 attached on the floor F, which constitutes a part of the body of the automobile. The first battery case 4 covers a nickel battery. The second battery case 5 covers a lithium battery. The nickel battery or the lithium battery is mounted according to the vehicle type. Here, the first battery case 4 and the second battery case 5 correspond to the "battery case" of the present disclosure.

The first battery case 4 and the second battery case 5 are rectangular in shape when viewed from above, and have approximately the same length from front to rear and from right to left. The first battery case 4 and the second battery case 5 are rectangular in shape when viewed from the front. The shape of a first upper surface 4*a* of the first battery case 4 and a second upper surface 5*a* of the second battery case 5 are different. Specifically, as shown in FIG. 2, the first upper surface 4*a* includes a flat surface portion 4*a*1, which is on the front side and extends horizontally, and an inclined surface portion 4*a*2, which is on the rear side and extends downwardly. The ratio of the dimensions of the flat surface portion 4*a*1 and the inclined surface portion 4*a*2 in the front-rear direction is approximately 3:1. The inclined surface portion 4*a*2 has no portion projecting above the inclined surface portion 4*a*2, although some portions of the inclined surface portion 4*a*2 are formed in a stair-like shape at the center of the right-left direction as shown in FIGS. 3 and 4. As shown in FIGS. 2 to 4, the second upper surface 5*a* has a projecting surface portion 5*a*1 whose cross-section projects upward at the center of the front-rear direction. A front curved surface portion 5*a*2 is formed at the front side of the projecting surface portion 5*a*1. The front curved surface portion 5*a*2 smoothly curves and extends forwardly and downwardly from the projecting surface portion 5*a*1. A rear curved surface portion 5*a*3 is formed at the rear side of the projecting surface portion 5*a*1. The rear curved surface portion 5*a*3 smoothly curves and extends backwardly and downwardly from the projecting surface portion 5*a*1. When the cross-section of the first upper surface 4*a* and the cross-section of the second upper surface 5*a* are superimposed, the vertical dimensional difference between the flat surface portion 4*a*1 and the projecting surface portion 5*a*1 is about 15 mm at the maximum. The vertical dimensional difference between the inclined surface portion 4*a*2 and the rear curved surface portion 5*a*3 is about 10 mm at maximum. Here, the first upper surface 4*a* and the second upper surface 5*a* correspond to the "upper surface" of the present disclosure, respectively.

The seat cushion 2 is formed by covering the cushion pad 10 with the cushion cover 6, which is an outer surface material. The cushion pad 10 is a cushion material in which a cushion frame (not shown) forming a framework is inserted. The seat cushion 2 has a pair of right and left seats 2A and a center seat 2B disposed between the right and left seats 2A, and is formed in a symmetrical shape.

As shown in FIGS. 2 to 6, the cushion pad 10 has an upper surface 10*a* and a lower surface 10*b*. The upper surface 10*a* is the side of the occupant seated. The lower surface 10*b* is the side opposite to the occupant seated. The cushion pad 10 is formed by integrally connecting a first pad layer 11 and a second pad layer 12. The first pad layer 11 is formed from a polyurethane foam molded from a polyurethane resin, and its density is set at about 0.045±0.005 g/cm$^3$, for example. The first pad layer 11 has a first pad upper surface 11*a*, which is the seating surface side of the cushion pad 10, and a first pad lower surface 11*b*, which is the opposite side of the seating surface. The first pad upper surface 11*a* of the first pad layer 11 coincides with the upper surface 10*a* of the cushion pad 10. The first pad lower surface 11*b* of the first pad layer 11 comprises an overlapped portion of the lower surface 10*b* of the cushion pad 10. The second pad layer 12 is a bead foam molding of an olefinic resin such as polypropylene or polyethylene, and its density is set at about 0.03 g/cm$^3$. The second pad layer 12 has a smaller density and higher elastic modulus than the first pad layer 11. The second pad layer 12 has a second pad upper surface 12*a*, which is the seating surface side of the cushion pad 10, and a second pad lower surface 12*b*, which is the opposite side of the seating surface. The second pad upper surface 12*a* of the second pad layer 12 is a surface that abuts and connects with a part of the first pad lower surface 11*b* of the first pad layer 11. The second pad lower surface 12*b* of the second pad layer 12 is a part of the lower surface 10*b* of the cushion pad 10. The cushion pad 10 is formed by placing the second pad layer 12, which has been bead foam molded in advance, in a mold having a cavity in the shape of the cushion pad 10 and injecting a foaming material of polyurethane resin to form the first pad layer 11 in one piece. Here, the lower surface 10*b* corresponds to the "lower surface" of the present disclosure. The first pad layer 11 and the second pad layer 12 correspond to the "first cushion body layer" and the "second cushion body layer" of the present disclosure, respectively.

As shown in FIGS. 2 to 6, when the cushion pad 10 is placed on the first battery case 4 or the second battery case 5, the lower surface 10*b* of the cushion pad 10 is shaped such that it does not interfere with either the first upper surface 4*a* of the first battery case 4 or the second upper surface 5*a* of the second battery case 5, and abuts against either the first upper surface 4*a* or the second upper surface 5*a*. As shown in FIGS. 2 to 4, the front-end part of the lower surface 10*b* of the cushion pad 10 is supported by two pipes 7 that are attached to the floor F and extend in the right and left directions. The part of the lower surface 10*b* closer to the front than the center in the front-back direction is abutted and supported against the projecting surface portion 5*a*1 of the second battery case 5, and is separated upward by a maximum of 15 mm from the flat surface portion 4*a*1 of the first battery case 4. The part of the lower surface 10*b* closer to the rear than the center in the front-back direction is abutted and supported against the inclined surface portion 4*a*2 of the first battery case 4, and is separated upward by a maximum of 10 mm from the rear curved surface portion 5*a*3 of the second battery case 5. The rear-end part of the lower surface 10*b* of the cushion pad 10 is supported by the pipe members 8, which is attached to the floor F and extending in the right and left directions.

As shown in FIGS. 2 to 6, when the cushion pad 10 is placed on the first battery case 4, the part of the lower surface 10*b* closer to the rear than the center in the front-rear direction abuts against and is supported by the inclined surface portion 4*a*2 of the first battery case 4. The part of the lower surface 10*b* closer to the front than the center in the front-rear direction is separated upward by a maximum of 15 mm from the flat surface portion 4*a*1 of the first battery case 4. However, the distance therebetween is small and the second pad layer 12, which has a high elastic modulus, is positioned opposite to the first battery case 4. Therefore, the deformation of the cushion pad 10 in the up-down direction can be suppressed to an acceptable level. When the cushion pad 10 is placed on the second battery case 5, the part of the lower surface 10*b* closer to the front than the center in the front-rear direction abuts against and is supported by the projecting surface portion 5*a*1 of the second battery case 5. The part of the lower surface 10*b* closer to the rear than the center in the front-rear direction is separated upward by a maximum of 10 mm from the projecting surface portion 5*a*3 of the second battery case 5. However, the distance therebetween is small and the second pad layer 12, which has a high elastic modulus, is positioned opposite to the second battery case 5. Therefore, the deformation of the cushion pad 10 in the up-down direction can be suppressed to an acceptable level.

The embodiment configured as described above has the following advantageous effects. When the lower surface 10*b* of the cushion pad 10 is brought close to the first upper surface 4*a* of the first battery case 4 disposed on and attached to the floor For the second upper surface 5*a* of the second battery case 5 disposed on and attached to the floor F, the shape of the lower surface 10*b* of the cushion pad 10 is such that it does not interfere with either the first upper surface 4*a* or the second upper surface 5*a*, but is in contact with and supported by either part of the first upper surface 4*a* or part of the second upper surface 5*a*. This allows the cushion pad 10 to be placed and attached on the first battery case 4 attached on the floor For on the second battery case 5 attached on the floor F with only one type. Therefore, the increase in the number of parts can be suppressed.

The cushion pad 10 has the first pad layer 11 on the seating side and the second pad layer 12 on the side opposite the seating side. The second pad layer 12 is harder than the first pad layer 11. At least a second pad lower surface 12*b* of the second pad layer 12 is placed in contact with the first upper surface 4*a* or the second upper surface 5*a*. Thereby, the cushion pad 10 is supported by the second pad layer 12, which is harder than the first pad layer 11, in contact with the first upper surface 4*a* or the second upper surface 5*a*. Even if some clearance occurs between the lower surface 10*b* and the first upper surface 4*a* or the second upper surface 5*a*, the upper surface 10*a* is prevented from being significantly concaved.

Although a certain embodiment was described above, the present disclosure is not limited to the appearance and configuration, and various changes, additions, and deletions are possible to the extent that the gist of the invention is not changed. For example, the following are examples.

1. In the above embodiment, the present disclosure was applied to the cushion pad 10 of an automobile rear seat 1, which is a bench seat for three passengers. However, it can also be applied to a cushion pad for a seat for single passenger.

2. In the above embodiment, the second pad layer 12 was connected to the first pad layer 11 by integral foaming during foam molding. However, the first pad layer 11 and the second pad layer 12 may also be attached by adhesion or other means.
3. In the above embodiments, the present disclosure was applied to automobile seats. However, it may also be applied to seats mounted on airplanes, ships, trains, etc.

According to one aspect of the present disclosure, a cushion body for vehicle seat which is placed on the variety of battery cases disposed on a floor, wherein when a shape of an upper surface of the battery cases attached on the floor are superimposed on each other, a lower surface of the cushion body has a shape that does not interfere with the upper surface of any of the battery cases and contacts with a part of the upper surface of any of the battery cases.

This allows the cushion body for vehicle seat to be placed on the upper surface of multiple types of battery cases by providing only one type of cushion body. Therefore, the increase in the number of parts can be suppressed.

According to another aspect of the present disclosure, the cushion body has a first cushion body layer on the side of the seating surface and a second cushion body layer arranged in a layered configuration on the side opposite the seating surface of the first cushion body layer. The second cushion body layer is harder than the first cushion body layer. At least the second cushion body layer is disposed in contact with the battery case.

The cushion body is supported by the second cushion body layer, which is harder than the first cushion body layer, contacting the upper surface of the battery case. Therefore, even if some clearance is generated between the first cushion body layer and the upper surface of the battery case, the seating surface of the first cushion body layer is prevented from being significantly concaved.

The various examples described above in detail with reference to the attached drawings are intended to be representative of the present disclosure and are thus non-limiting embodiments. The detailed description is intended to teach a person of skill in the art to make, use and/or practice various aspects of the present teachings, and thus does not limit the scope of the disclosure in any manner. Furthermore, each of the additional features and teachings disclosed above may be applied and/or used separately or with other features and teachings in any combination thereof, to provide an improved cushion body for vehicle seat, and/or methods of making and using the same.

We claim:

1. A cushion body for vehicle seat configured to be placed on a first battery case and a second battery case attached on a floor, the first battery case and the second battery case respectively including a first upper surface and a second upper surface having different shapes from each other, each of the first upper surface and the second upper surface including a first region and a second region which is a vehicle front side of the first region, a portion of the first upper surface of the first battery case in the first region being higher than a portion of the second upper surface of the second battery case in the first region, a portion of the second upper surface of the second battery case in the second region being higher than a portion of the first upper surface of the first battery case in the second region, wherein the cushion body includes an upper surface on which an occupant is seated and a lower surface; and the lower surface of the cushion body extends to cover the first region and the second region and has a shape, such that when the first battery case is attached on the floor, the lower surface of the cushion body contacts the portion of the first upper surface of the first battery case in the first region and does not contact the portion of the first upper surface of the first battery case in the second region, and when the second battery case is attached on the floor, the lower surface of the cushion body contacts the portion of the second upper surface of the second battery case in the second region and does not contact the portion of the second upper surface of the second battery case in the first region.

2. The cushion body according to claim 1, comprising:

a first cushion body layer arranged on the upper surface side of the cushion body; and a second cushion body layer arranged in a layered configuration below the first cushion body layer, wherein the second cushion body layer is configured to be in contact with the first and second battery cases.

3. The cushion body according to claim 2, wherein the first cushion body layer and the second cushion body layer are integrally connected by form molding, adhesion or combination thereof.

4. The cushion body according to claim 2, wherein the second cushion body layer is harder than the first cushion body layer.

5. The cushion body according to claim 2, wherein the second cushion body layer has a smaller density and higher elastic modulus than the first cushion body layer.

6. The cushion body according to claim 1, wherein in the first region, a vertical dimensional difference between the first upper surface and the second upper surface is 10 mm or less, and in the second region a vertical dimensional difference between the first upper surface and the second upper surface is 15 mm or less.

* * * * *